United States Patent [19]

Wolf, Jr. et al.

[11] 3,937,064
[45] Feb. 10, 1976

[54] MEMBRANE LEAK CHECKING TECHNIQUE

[75] Inventors: Ludwig Wolf, Jr., Barrington; David G. Dominguez, Fox Lake, both of Ill.

[73] Assignee: Baxter Laboratories, Inc., Deerfield, Ill.

[22] Filed: Jan. 17, 1975

[21] Appl. No.: 541,815

[52] U.S. Cl. ............................. 73/40; 73/159
[51] Int. Cl.² ................................. G01M 3/04
[58] Field of Search .......... 73/40, 37.7, 41, 159, 37, 73/38

[56] References Cited
UNITED STATES PATENTS
3,811,317   5/1974   Leonard et al. ..................... 73/40

*Primary Examiner*—Donald O. Woodiel
*Attorney, Agent, or Firm*—Louis Altman; Garrettson Ellis

[57] ABSTRACT

Method and apparatus for testing a membrane strip for leaks due to pin holes are disclosed. A detector fluid is applied to one face of the strip while bringing a detection medium into proximity with the other face thereof, and producing a pressure difference between the opposite faces of the strip in a sense to cause flow of the detector fluid through any open pin holes in the strip, and accordingly into contact with the detection medium. In accordance with this invention, a membrane-compatible liquid is applied to the membrane strip prior to testing for pin holes, so that the liquid is retained in the pin holes by capillary attraction. Accordingly, the flow of detector fluid through pin holes which are less than a predetermined size is prevented. The predetermined size may be controlled by the magnitude of pressure difference between opposite faces and the nature of the membrane-compatible liquid. As a result, the presence only of holes larger than the predetermined size is detected.

10 Claims, 2 Drawing Figures

U.S. Patent  Feb. 10, 1976  3,937,064
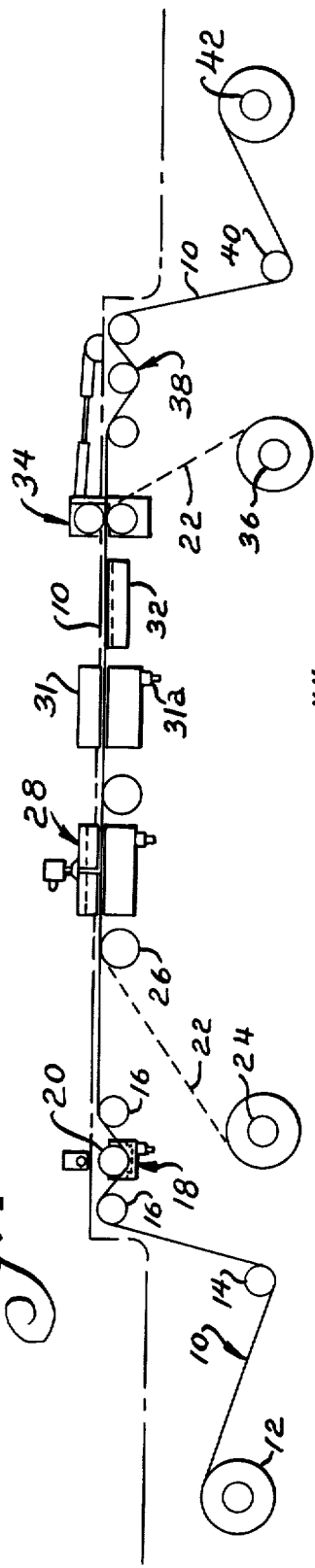
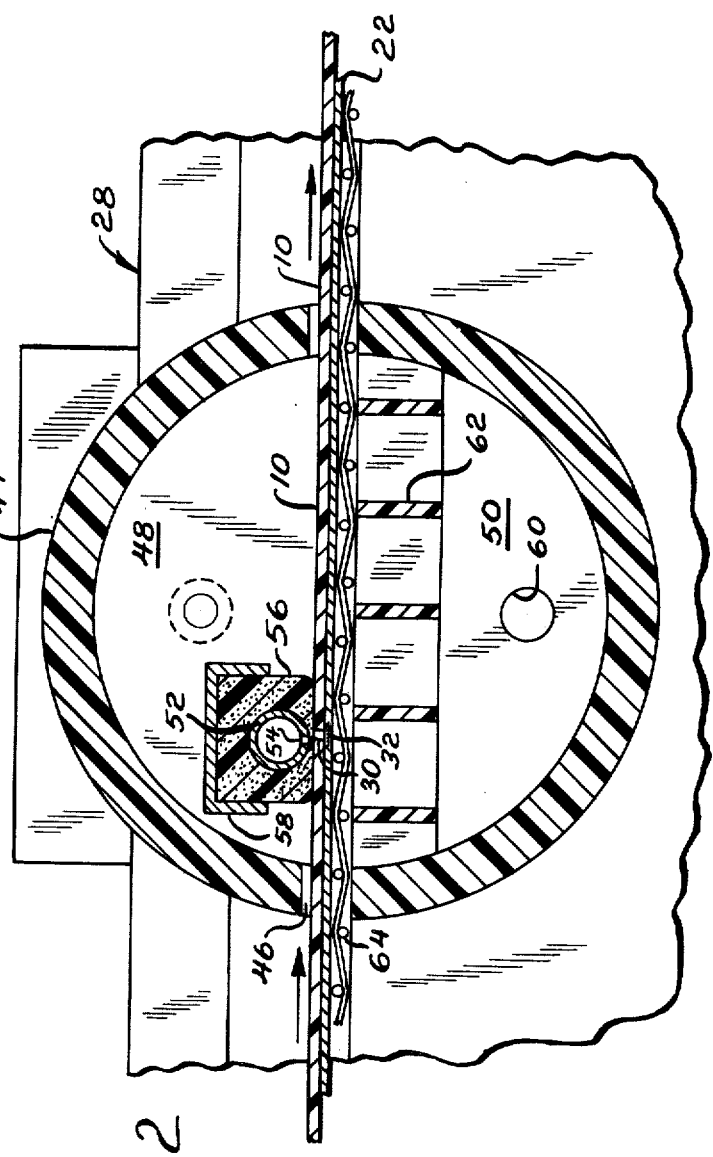

MEMBRANE LEAK CHECKING TECHNIQUE

BACKGROUND OF THE INVENTION

In U.S. Pat. No. 3,811,317, an apparatus is disclosed for testing membrane for holes by progressively passing a roll of membrane through a chamber in which one side of the membrane is exposed to gaseous ammonia, and the other side of the membrane is exposed to a reduced pressure, to draw the ammonia through any holes present in the membrane. When ammonia does so pass through a hole in the membrane, it encounters a sensing medium such as diazo indicator paper, where the presence of the ammonia is recorded by the formation of a blue mark on the diazo paper. Accordingly, the holes in the membrane may be located, and patched if desired.

In U.S. Pat. No. 3,757,955, membrane diffusion devices such as blood oxygenators are taught in which the diffusion membrane is made of a hydrophobic material such as polypropylene or polytetrafluoroethylene. The membrane defines myriads of tiny pores, for example of approximately 1/2 micron width. This type of porous membrane has been shown to exhibit highly superior diffusion properties for carbon dioxide and oxygen, while still preventing the passage of blood across the membrane, when the diffusion device is properly constructed. Blood oxygenator devices utilizing such porous, hydrophobic membrane have recently become commercially available.

Although the diffusion membrane in such blood oxygenator devices is porous, it is still necessary that it be free of holes which are 50 to 100 microns in diameter and greater. When such holes are present, significant amounts of blood can leak from the blood side of the membrane to the oxygen side, which is of course highly undesirable. When this takes place, the entire diffusion device usually must be discarded, and a new one selected. Accordingly, prior to its assembly into an oxygenator, it is important to determine whether or not the porous, hydrophobic membrane used in an oxygenator possesses such larger holes. There is a substantial cost saving in either patching or discarding the unused, defective membrane rather than assembling the membrane into an oxygenator device, and then discovering that holes of excessive size are present.

There exists, therefore, a need for a method of detecting enlarged holes in porous membrane material which contains pores which are smaller than the holes to be detected. In the apparatus of Patent No. 3,811,317 cited above, it has been found that ammonia tends to diffuse through all holes of any size in the micronic range, which makes the detection of enlarged holes in normally porous membrane virtually impossible.

In accordance with this invention, a method and apparatus are disclosed in which porous membrane material may be scanned by a non-electrical technique for holes of larger size, even though the enlarged holes are still so small that they may not be reliably spotted by means of visual inspection.

The method and apparatus of this invention can be also used for detecting holes above a predetermined size in non-porous membrane or the like, but is the first available apparatus for detecting enlarged pin holes in normally porous membrane medium by a non-electrical technique, precisely "mapping" the exact location of each hole on a detection medium, which may be diazo indicator paper when ammonia is the detector fluid. By inspection of the detection medium, the pin hole is precisely located without further effort, and may be patched.

DESCRIPTION OF THE INVENTION

In accordance with this invention, a method and apparatus for testing a membrane strip for leaks are disclosed. The apparatus of this invention typically includes transport means for advancing the strip along a process path, and a test station, including distributor means bridging the process path, for applying detector fluid to successive regions of one face of the strip traversing the distributor means. Means are also provided for producing a pressure difference between opposite faces of the strip at the distributor means in a sense to cause flow of the detector fluid through any open pin holes in said strip.

The transport means also includes further means for moving a detection medium in registry with the other face of the strip during travel through the test station. Accordingly, an indication of pin holes in the strip of sufficient size to allow the indicator fluid to contact the detection medium is produced on the detection medium. Such holes are then precisely located by reference to the detection medium before the membrane strip and detection medium are removed from registry with the membrane strip.

In accordance with this invention, means are also provided for applying to the advancing membrane strip, prior to its passing through the test station, a membrane-compatible liquid for filling the pin holes by capillary attraction. Accordingly, the passage of the indicator fluid through pin holes which are smaller than a predetermined size is prevented by the presence of the membrane-compatible liquid. However, with respect to pin holes over the predetermined size, the pressure difference between the opposite faces of the strip is sufficient to overcome the capillary attraction and to cause detector fluid to break through the liquid in such pin holes, thus permitting the detector fluid to reach the detection medium by way of the enlarged pin holes. When this takes place, the event is recorded by the detection medium.

Accordingly, by appropriate adjustment of the pressure difference between the opposite faces of the strip and/or the capillary properties of the membrane-compatible liquid, the minimum size of the pin holes desired to be detected can be adjusted, so that the apparatus itself is adjustable in accordance with the needs of the situation.

For example, when a pressure differential of 300 mm. of mercury is provided across the membrane by evacuating the detection medium side of the membrane, the apparatus of this invention can generally detect at least 100 micron pin holes and frequently smaller.

The term "membrane-compatible liquid" means that the liquid has such a surface tension as to permit it to exhibit sufficient cohesive attraction toward the membrane material that it tends to fill the membrane pores and be retained there by capillary attraction.

Conventional, volatile halofluorocarbon liquids can be used in accordance with this invention to test porous, hydrophobic membranes made of such materials as polytetrafluoroethylene or polypropylene. These liquids may be optionally in admixture with water or other solvents, to alter the surface tension characteristics as desired. Such halofluorocarbon liquids are sold under the name "Freon" and are readily commercially available. For example, such materials as 1,1,2-trichloro-1,2,2-trifluoroethane; 1,2-dichloro-1,1,2,2-tetrafluoroethane; trichlorofluoromethane; and mixtures thereof can be used in accordance with this invention.

In other circumstances, other organic solvents, which are preferably non-inflammable and relatively non-toxic, can be used, such as trichloroethylene.

Referring to the drawings,

FIG. 1 is a schematic illustration of the method and apparatus of this invention.

FIG. 2 is an enlarged view, taken in vertical section, of the pin hole testing station shown schematically in FIG. 1.

Referring to the drawings, membrane 10 intended for testing is drawn off of a storage roller 12 and passed about alignment rollers 14, 16 for passage through a membrane-compatible liquid application station. Station 18 may comprise chiefly a container of liquid, e.g., a halofluorocarbon type liquid such as Freon TF, sold by the DuPont Chemical Co., when the membrane is made of porous hydrophobic material, e.g., a thin film of polytetrafluoroethylene or polypropylene having many pores of 0.1 to 0.5 micron width, and normally free of pin holes which are 50 or more microns in width.

Sponge roller 20 assures that membrane 10 is immersed in the halofluorocarbon liquid at station 18 to fill the pores of the membrane with halofluorocarbon by capillary attraction.

Detector medium strip 22 such as diazo (Ozalid) paper is drawn off of roller 24 and brought into adjacent relation with membrane 10 by roller 26, so that the two strips 10, 22 pass into pin hole detection station 28, moving in unison together.

There, the detector fluid (such as ammonia) is applied to the upper surface of membrane 10 while a pressure difference is produced in a sense to urge the detector fluid to pass through any pin holes in the membrane. The pressure is adjusted to cause the membrane-compatible liquid to be pushed out of pin holes which are larger than a desired, predetermined size by the pressure. When this takes place, the detector fluid passes through membrane 10, as at pin hole 30, to cause an indicating mark to form on indicator strip 32.

Membrane 10 then passes through optional drying station 31, in which evacuation is provided to boil off the liquid detector fluid and thus dry the membrane. Evacuation port 31a is shown for connection to a conventional vacuum pump. If desired, heating coils can also be provided to hasten the removal of all membrane-compatible liquid prior to completion of the process. Frequently, however, halofluorocarbon liquids of about two carbon atoms per molecule are sufficiently volatile so that no drying station 31 is necessary.

Following this, membrane 10 passes across repair station 32 which comprises a table or other horizontal surface, where the membrane is visually inspected. In the preferred embodiment, thin, porous polytetrafluoroethylene or polypropylene membranes are sufficiently translucent so that the purple mark produced by diazo paper in the presence of ammonia is visible through the membrane 10. Accordingly, the operator applies a sealing compound such as silicone rubber room temperature vulcanizing sealant, whenever a purple mark is visually seen as membrane 10 passes across table 32. Accordingly, the pin holes are sealed.

Membrane 10 and strip 22 are then passed through nip roller 34, and the two strips are separated, strip 22 passing to storage roller 36, and membrane 10 passing through tensioning roller assembly 38, and ultimately about alignment roller 40 to storage roller 42.

Pin hole testing station 28, and other features of the apparatus of this invention, may be constructed in a manner similar to that disclosed in U.S. Pat. No. 3,811,317. The testing station shown in detail in FIG. 2 is essentially similar to the testing station disclosed in that patent.

Referring in greater detail to FIG. 2, testing station 28 comprises a compartmented test head 44 having a horizontal slit 46, defined between an upper supply chamber 48 and a lower vacuum chamber 50. An exhaust stub 52 is shown associated with the supply chamber 48 to produce an air sweeping flow on the downstream extremity of the vacuum slit so that ambient air flows continuously over the membrane surface to sweep it free of any excess ammonia.

As described in U.S. Pat. No. 3,811,317, distribution tube 52 has a uniformly-spaced set of holes 54 opening toward the membrane, located adjacent the upstream extremity of vacuum slit 46 that divides the test head. Distribution tube 52 is embedded within a foam rubber block 56, which is soft enough to accommodate contact without damage to the membrane. The foam block ensures uniform application of the ammonia to the membrane, and is provided with covering walls 58 on its side, top and ends, positioned to substantially impede entry of air at the upstream region of the vacuum slit.

Vacuum draw off stub 60 is provided for application of the vacuum to chamber 50. Grill work 62 spans substantially the entire width of chamber 50 to serve as a support for drive belt 64, which may be constructed in the manner described in the aforesaid patent.

Accordingly, control of the amount of air drawn off through stub 60 causes a variation in the pressure differential between chambers 48 and 50. This in turn affects the size of the pin holes 30 detected in membrane 10. Accordingly, the minimum size of pin holes detected by the apparatus of this invention can be adjusted as desired by the user.

The above has been offered for illustrative purposes only, and is not for the purpose of limiting the invention of this application, which is as defined in the claims below.

That which is claimed is:

1. In a method for testing a membrane strip for leaks due to pin holes in said strip by applying a detector fluid to one face of said strip while bringing a detection medium into proximity with the other face of said strip, and producing a pressure difference between opposite faces of the strip in a sense to cause flow of the detector fluid through any open holes in said strip and into contact with the detection medium, the improvement comprising: applying to said membrane strip a membrane-compatible, volatile liquid medium to fill said pin holes and to be retained therein by capillary attraction, to prevent the flow of detector fluid through pin holes which are less than a predetermined size.

2. The method of claim 1 in which said membrane strip is a thin film of hydrophobic material selected from the group consisting of polypropylene and polytetrafluoroethylene, said membrane defining a large plurality of pores of about 0.1 to 0.5 micron width, said membrane being normally free of pin holes which are about 50 microns in width and greater.

3. The method of claim 2 in which the compatible liquid is a readily volatilizable halofluorocarbon liquid.

4. The method of claim 3 in which said detector fluid is ammonia vapor.

5. The method of claim 4 in which said detection medium is ammonia-sensitive indicator paper.

6. In apparatus for testing a membrane strip for leaks, including transport means for advancing the strip along a process path, and a test station including distributor means bridging said path for applying detector fluid to successive regions of one face of said strip traversing said distributor means, means for producing a pressure difference between opposite faces of said strip in a sense to cause flow of said detector fluid through any open pin holes in said strip, said transport means including means for moving a detection medium in registry with the other face of the strip during travel through said test station, to produce an indication of any pin holes in said strip which allow the indicator fluid to contact the detection medium, the improvement comprising: means for applying to the advancing membrane strip, prior to passing through said test station, a membrane-compatible, volatile liquid for filling said pin holes through capillary attraction, to prevent the passage of the indicator fluid through pin holes which are smaller than a predetermined size.

7. The apparatus of claim 6 in which said membrane strip is a thin film of hydrophobic material selected from the group consisting of polypropylene and polytetrafluoroethylene, said membrane defining a large plurality of pores of about 0.1 to 0.5 micron width, said membrane being normally free of pin holes which are about 50 or more microns in width.

8. The apparatus of claim 7 in which the membrane-compatible liquid is a readily volatilizable halofluorocarbon liquid.

9. The apparatus of claim 8 in which said detector fluid is ammonia vapor.

10. The apparatus of claim 9 in which said detection medium is ammonia-sensitive indicator paper.

* * * * *